United States Patent [19]
Arai et al.

[11] Patent Number: 5,533,147
[45] Date of Patent: Jul. 2, 1996

[54] SEGMENTATION OF HANDWRITTEN PATTERNS USING STROKE AND JUMP VECTORS

[75] Inventors: Tsunekazu Arai, Tama; Shinsuke Takeuchi; Kazuhiro Matsubayashi, both of Yokohama, all of Japan

[73] Assignee: Canon Kabushiki Kaisha, Tokyo, Japan

[21] Appl. No.: 334,003

[22] Filed: Nov. 2, 1994

Related U.S. Application Data

[63] Continuation of Ser. No. 1,220, Jan. 6, 1993, abandoned, which is a continuation of Ser. No. 704,871, May 23, 1991, abandoned.

[30] Foreign Application Priority Data

May 29, 1990 [JP] Japan .................................. 2-137277

[51] Int. Cl.[6] .................................................... G06K 9/62
[52] U.S. Cl. ........................... 382/179; 382/187; 382/202
[58] Field of Search ............................ 382/3, 9, 13, 24, 382/25, 26, 177, 179, 187, 202, 203, 204, 209

[56] References Cited

U.S. PATENT DOCUMENTS

| | | | |
|---|---|---|---|
| 3,999,161 | 12/1976 | van Bilzem et al. | 340/146.3 AC |
| 4,653,107 | 3/1987 | Shojima et al. | 382/13 |
| 4,718,103 | 1/1988 | Shojima et al. | 382/13 |
| 4,731,857 | 3/1988 | Tappert | 382/9 |
| 4,764,972 | 8/1988 | Yoshida et al. | 382/13 |
| 4,933,977 | 6/1990 | Ohnishi et al. | 382/9 |
| 4,953,225 | 8/1990 | Togawa et al. | 382/13 |
| 5,001,765 | 3/1991 | Jeanty | 382/9 |
| 5,029,223 | 7/1991 | Fujisaki | 382/13 |
| 5,121,441 | 6/1992 | Chefalas et al. | 382/13 |
| 5,157,737 | 10/1992 | Sklarew | 382/13 |
| 5,166,666 | 11/1992 | Tanaka | 340/706 |
| 5,216,725 | 6/1993 | McCubbrey | 382/9 |

FOREIGN PATENT DOCUMENTS

| | | | |
|---|---|---|---|
| 62-120589 | 6/1987 | Japan | 382/13 |
| 62-193758 | 2/1989 | Japan | 382/9 |
| 63-193759 | 2/1989 | Japan | 382/9 |
| 1-265377 | 10/1989 | Japan | 382/13 |

OTHER PUBLICATIONS

English Translation of Japanese Kokai No. 62–120589, Jun., 1987.

English Translaton of Japanese Kokai No. 1–265377, Oct., 1989.

"Self–Organization of An Allograph Lexicon" by P. Morasso et al.; International Neural Network Conference; Jul. 9–13, 1990; Palais Des Congress–Paris, France; vol. 1; pp. 141–144.

"A System for Automatic Recognition of Handwirtten Words" by Paul Mermelstein et al.; Proc. of The Fall Joint Computer Conf. Oct. 1964; San Francisco, pp. 333–342.

*Primary Examiner*—Leo Boudreau
*Assistant Examiner*—Andrew W. Johns
*Attorney, Agent, or Firm*—Fitzpatrick, Cella, Harper & Scinto

[57] ABSTRACT

Disclosed are a pattern recognition method and apparatus which eliminate the complications of handwritten input by storing two or more patterns in memory beforehand, matching input patterns with the stored patterns, and delimiting and recognizing individual patterns from the input patterns based upon the pattern matching.

16 Claims, 7 Drawing Sheets

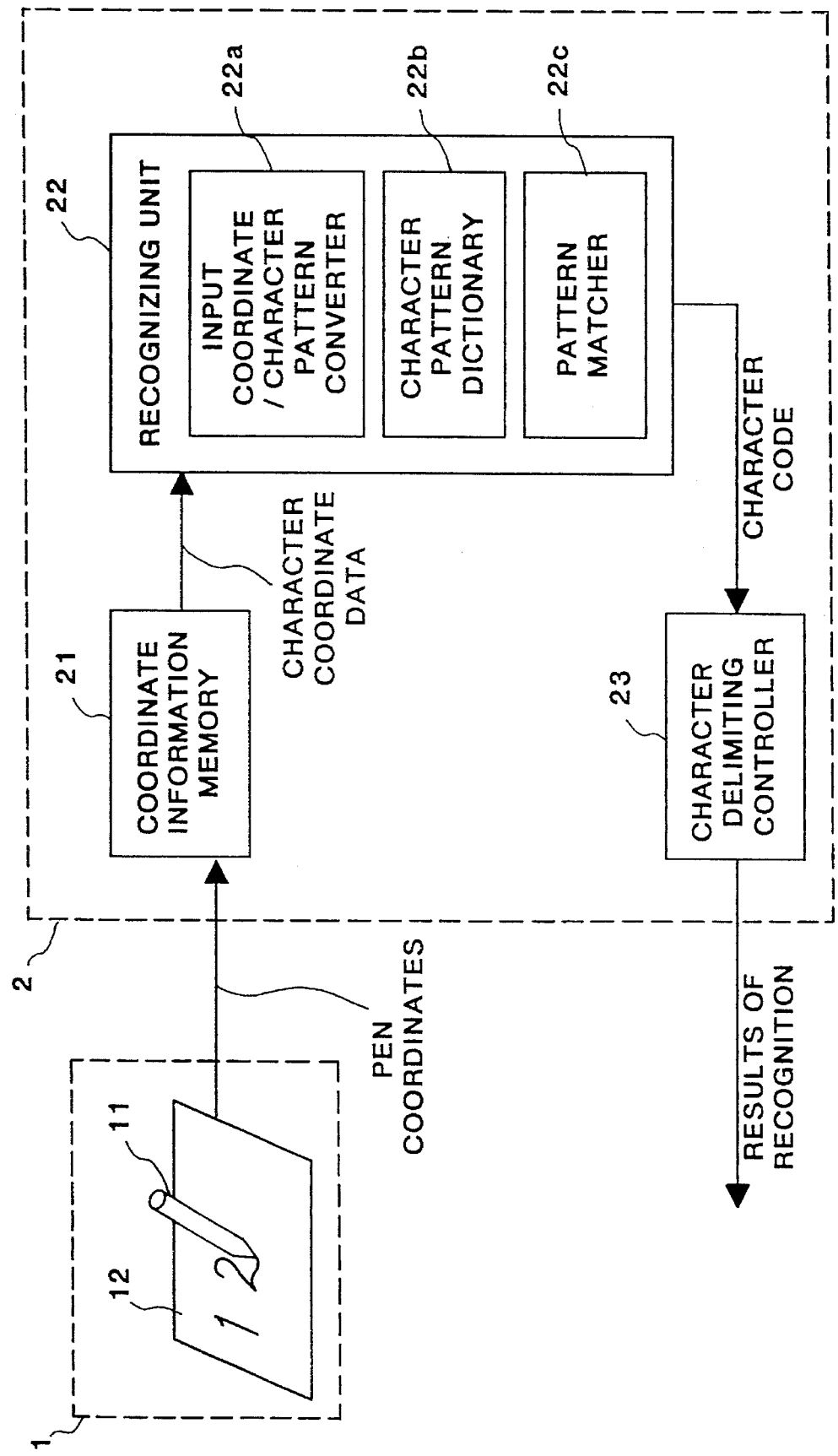
F I G. 1

| STROKE PATTERN | STROKE CODE |
| --- | --- |
| ↓ | 1 |
| → | 2 |
| 2 | 3 |
| 3 | 4 |
| 4 | 5 |
| 5 | 6 |
| 6 | 7 |
| 7 | 8 |
| 8 | 9 |
| 9 | 10 |
| 0 | 11 |

FIG. 4

| CHARACTER PATTERN DATA | | OUTPUT CODE |
|---|---|---|
| SINGLE-STROKE CHARACTER DATA | 1 | FF01H |
| | 2 | FF02H |
| | 3 | 2332H |
| | 4 | 2333H |
| | 5 | FF05H |
| | 6 | FF06H |
| | 7 | 2336H |
| | 8 | 2337H |
| | 9 | 2338H |
| | 10 | 2339H |
| | 11 | 2330H |
| TWO-STROKE CHARACTER DATA | 1, 3, 5 | 2334H |
| | 1, 2, 2 | FE00H |
| | 1, 3, 3 | FE00H |
| | 5, 3, 1 | 2334H |
| | 2, 5, 6 | 2335H |
| | 2, 3, 3 | FE00H |

F I G. 5

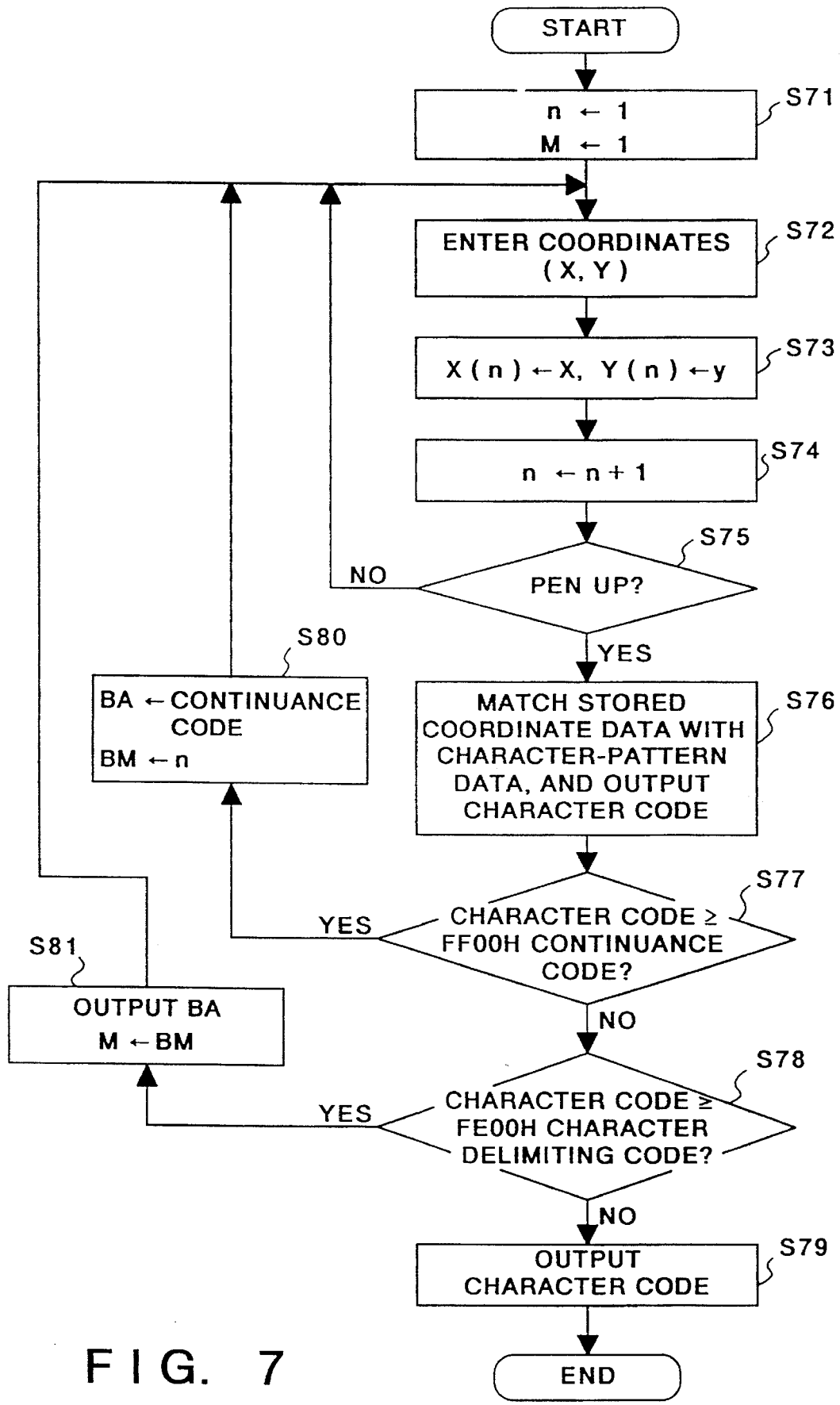
F I G. 7

SEGMENTATION OF HANDWRITTEN PATTERNS USING STROKE AND JUMP VECTORS

This application is a continuation of application Ser. No. 08/001,220 filed Jan. 6, 1993, now abandoned, which is a continuation of application Ser. No. 07/704,871 files May 23, 1991, abandoned.

BACKGROUND OF THE INVENTION

1. Field of the Invention

This invention relates to a pattern recognition method. More particularly, the invention relates to a method and apparatus for on-line recognition of a handwriting pattern, in which a pattern sequence inputted by handwriting in real-time is recognized upon being delimited pattern by pattern.

2. Description of the Prior Art

In the prior art, a pattern recognition apparatus such as an on-line, handwritten character recognition apparatus comprises a resistance-film digitizer serving as coordinate input means for inputting handwriting patterns; one of (a) pattern delimiting means for delimiting a pattern by measuring the period of time (hereinafter referred to as "pen-up time") a pen has been raised from the digitizer, (b) pattern-entry blocks for delimiting a pattern based upon the absolute position at which the pattern is entered, and (c) a recognition-execute key for inputting the end of entry of one pattern; and pattern recognizing means for performing recognition by matching coordinate information relating to one entered pattern with a dictionary of individual patterns.

In the example of the prior art described above, however, certain problems arise when it is desired to enter patterns in succession and the delimiting of the individual patterns is to be performed by measuring pen-up time, by using the pattern-entry blocks or by means of the recognition-execute key. Specifically, the problems encountered are as follows:

(1) Assume that a pattern is considered delimited when a fixed period of time has elapsed when measuring pen-up time. If the fixed period of time is made comparatively long, then the person doing the writing is constrained to wait a comparatively long period of time between entry of individual patterns. If the fixed period of time is made comparatively short, on the other hand, then the pen-up time between the first and second strokes of one and the same pattern must be made shorter than the aforementioned fixed period of time. Since this does now allow enough time for a pattern to be entered in a natural manner, cases arise in which pattern delimiting is performed erroneously.

(2) In the case where use is made of the pattern-entry blocks in which delimiting of an entered pattern is performed based upon absolute position, patterns cannot be entered at freely selected positions and care must be taken to assure that each individual pattern does not protrude from the block. As a result, when patterns are entered in a free, natural manner, erroneous delimiting of the patterns can occur.

(3) In the case where pattern delimiting is performed by pressing a recognition-execute key each time entry of one pattern ends, the key must be pressed after every single pattern is entered. This is a very troublesome operation.

SUMMARY OF THE INVENTION

An object of the present invention is to provide a pattern recognition method and apparatus in which the troubles involved in entering handwriting are eliminated.

According to the present invention, the foregoing object is attained by providing a pattern recognition method which comprises the steps of storing beforehand two or more patterns, and delimiting and recognizing individual patterns from input patterns based upon matching the input patterns with the stored patterns.

According to the present invention, the foregoing object is attained by providing a pattern recognition apparatus which comprises coordinate information memory means for storing coordinate information relating to inputted patterns, pattern memory means in which patterns including two or more patterns are stored beforehand, and pattern recognizing means for outputting pattern codes each of which include a pattern delimiting code based upon matching between the inputted patterns and patterns which include the patterns.

In accordance with the invention, coordinate information is matched with already stored patterns which include two or more patterns, and a pattern code which includes a pattern delimiting code is outputted based upon the results of matching. This makes it possible to enter successive characters naturally at any desired position and at any desired timing.

Thus, the present invention provides a pattern recognition method and apparatus which eliminate the annoyance involved in entering handwriting.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram showing the construction of a handwritten character recognition apparatus according to an embodiment of the present invention;

FIG. 4 is a correlation table showing the correlation between stroke patterns and stroke codes;

FIG. 5 is a diagram showing the composition of a character pattern dictionary;

FIG. 7 is a flowchart showing a processing procedure.

DESCRIPTION OF THE PREFERRED EMBODIMENT

Figure 2:
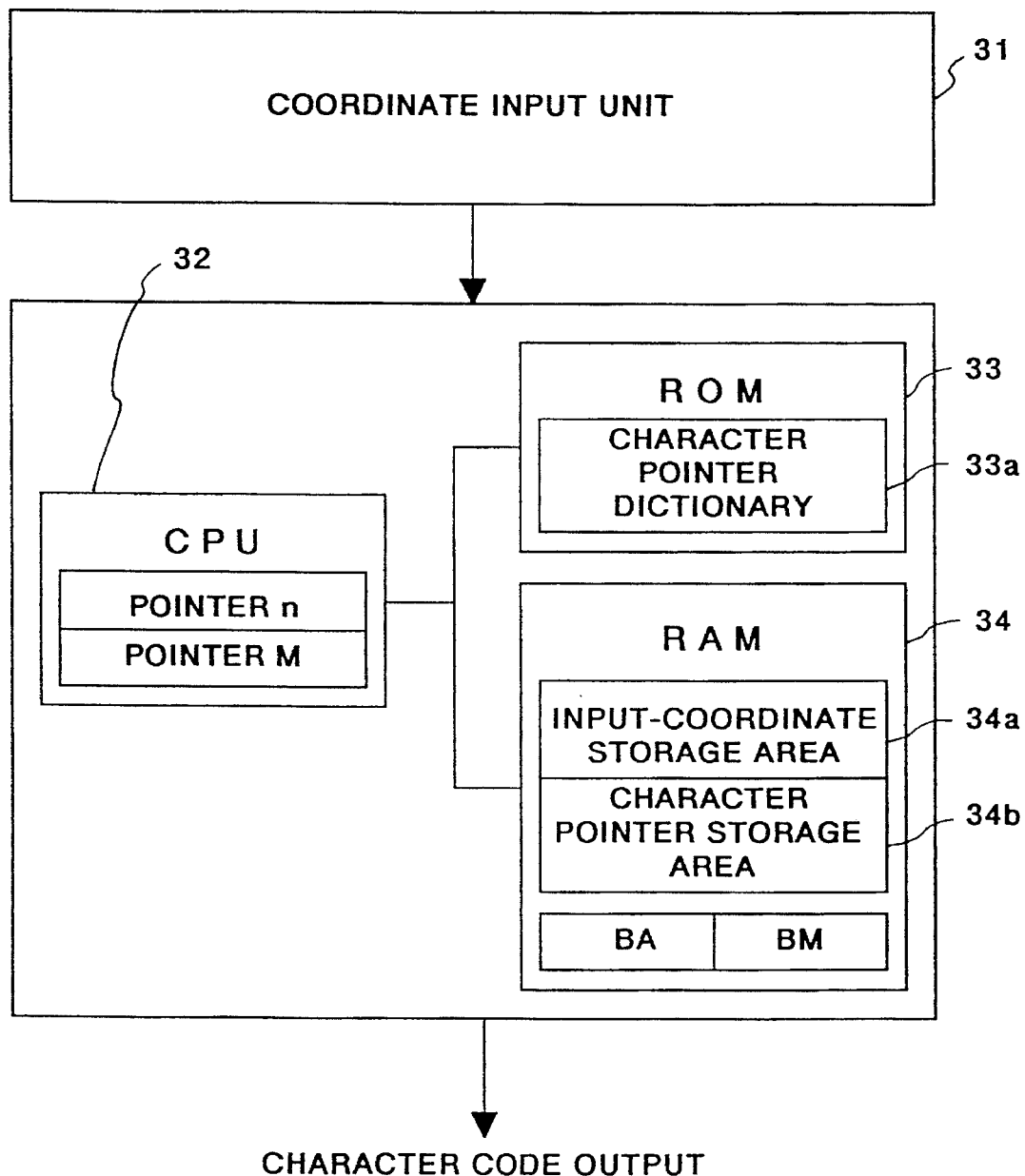
FIG. 2 is a block diagram showing an example of the hardware configuration according to this embodiment.

An embodiment of the present invention will now be described in detail with reference to the accompanying drawings. In this embodiment, an apparatus which recognizes handwritten characters will be described as one example of a pattern recognition apparatus. Also, in order to simplify the description, a processing procedure performed by this apparatus for recognizing numeral inputs will be discussed.

FIG. 1 is a block diagram showing the construction of an apparatus for recognizing handwritten characters according to this embodiment.

As shown in FIG. 1, the apparatus includes an input block 1 having an input pen 11 and an input unit 12. The apparatus further includes a processing block 2 comprising a coordinate information memory 21, a character recognizing unit 22 and a character delimiting controller 23. The input unit 12 is an input panel comprising a network of electrodes arrayed horizontally and vertically and enters coordinate data in response to being pressed by the input pen 11. The coordinate data is delivered to the coordinate information memory 21. The latter receives and stores the pen coordinate data sent from the input unit 12 and transmits the character coordinate data to the character recognizing unit 22. The latter comprises an input coordinate/character pattern converter 22a, a character pattern dictionary 22b which stores patterns inclusive of two or more compound character patterns, and a pattern marcher 22c. The character recognizing unit 22 recognizes the character coordinate data from the coordinate information memory 21 and provides the character delimiting controller 23 with a character code which includes a character-entry continuance code or a character delimiting code.

Figure 6:
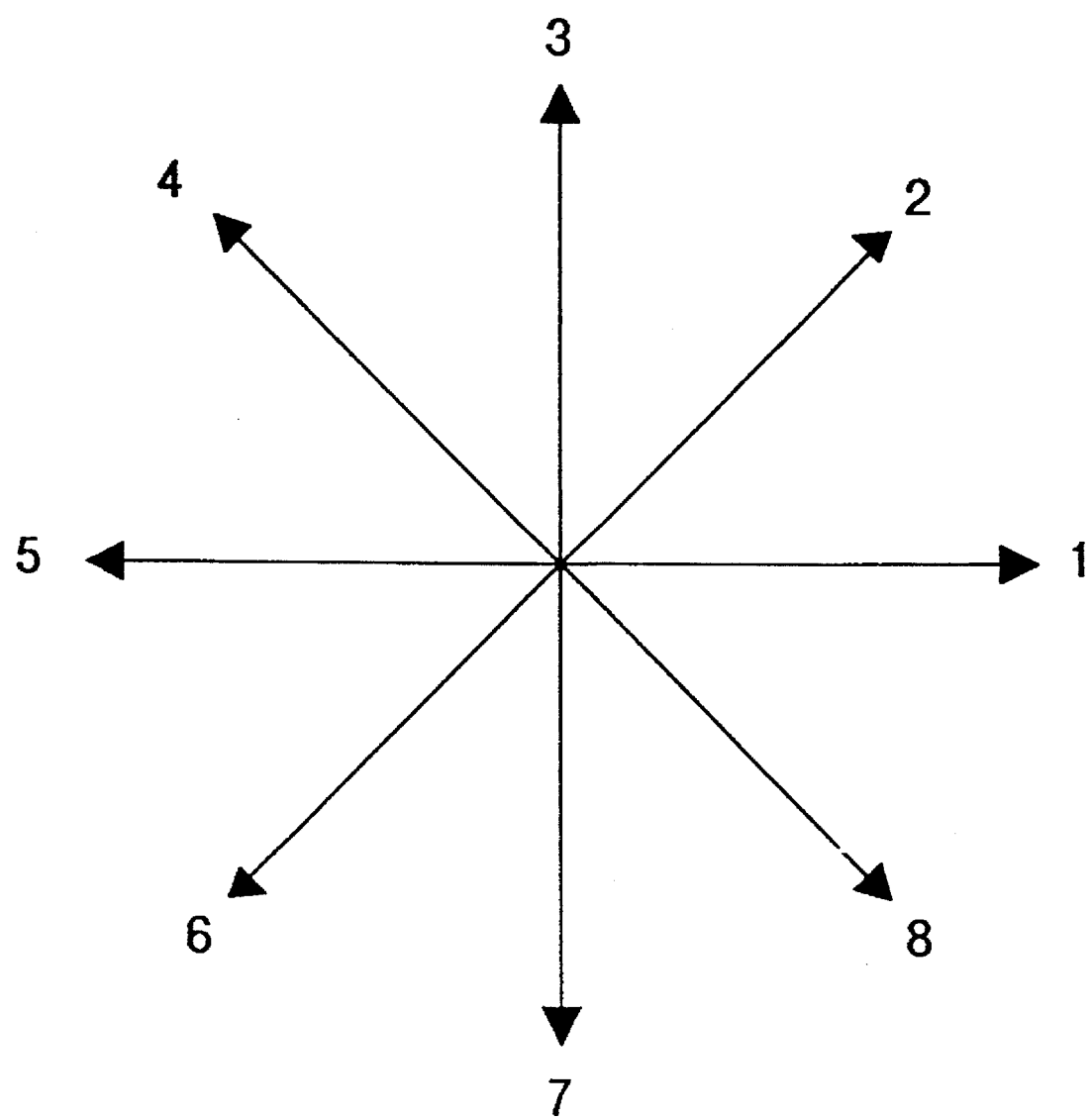
FIG. 6 is a diagram showing eight-direction vectors.

The input coordinate/character pattern converter 22a divides one stroke of coordinate data received from the coordinate information memory 21 into ten equal segments (where one "stroke" of data is that which enters from the start until the pen is raised from the input panel, or which enters from one moment the pen is raised until the next moment the pen is raised), converts the resulting equally divided vectors into vectors in eight directions, as shown in FIG. 6, and converts the vectorized patterns into stroke codes by the conversion table shown in FIG. 4 in order to simplify processing. A vector (jump vector) connecting the end coordinates of the first stroke and the starting coordinates of the second stroke also is similarly converted into vectors in eight directions, thereby converting an input coordinate character into a character pattern. The character pattern dictionary 22b has the composition shown in FIG. 5. By way of example, the numeral "4" is stored as a character pattern of "5" (stroke code), "3" (jump vector), "1" (stroke code), and an input of successive numerals "12" is stored as a character pattern of "1" (stroke code), "3" (jump vector), "3" (stroke code). The pattern marcher 22c matches the input character pattern, which results from character-pattern conversion by the input coordinate/character pattern converter 22a, with the character patterns in the character pattern dictionary 22b, outputs a character code, which includes the character-entry continuance code or the character delimiting code, as the result of recognition, and sends the character code to the character delimiting controller 23.

Based upon the character code received from the character recognizing unit 22, the character delimiting controller 23 continues character entry if the character code contains the character-entry continuance code. If the character code contains the character delimiting code, however, the character delimiting controller 23 converts the data which prevails from the moment of code arrival until just before one stroke to corresponding JIS code and outputs the JIS code as one character, and recognizes the data from just before one stroke as the next character. If the character code is the JIS code, the JIS code is outputted from the character delimiting controller 23. The character delimiting controller 23 contains a converting table (not shown) for converting the character-entry continuance code to the corresponding JIS code.

Each step of this processing will now be described in further detail.

FIG. 2 is a block diagram illustrating an example of the hardware configuration of this embodiment. Numeral 31 denotes a coordinate input unit, namely a conventional input panel comprising a network of electrodes arrayed horizontally and vertically, for entering coordinate data in response to being pressed by the input pen 11. The coordinate data is delivered to a central processing unit (hereinafter referred to as a CPU) 32.. The latter has a ROM 33, in which character patterns and a processing procedure in accordance with the flowchart of FIG. 7 are stored in advance, and a RAM 34 for storing processed data. In accordance with the processing procedure stored in the ROM 33, the CPU 32 stores coordinate values, which have been entered from the coordinate input unit 31, in an input-coordinate storage area 34a of the RAM 34, creates a character pattern from the input coordinate data, stores the character pattern in a character-pattern storage area 34b of the RAM 34, matches this pattern with a character-pattern dictionary 33a stored previously in the ROM 33, and outputs a pattern code, which is the result of recognition based upon the pattern matching. The CPU 32 has pointers n, M, and the RAM 34 a continuance-code storage area BA and a point storage area BM. These are used in the description of the processing procedure given below.

Figure 3:
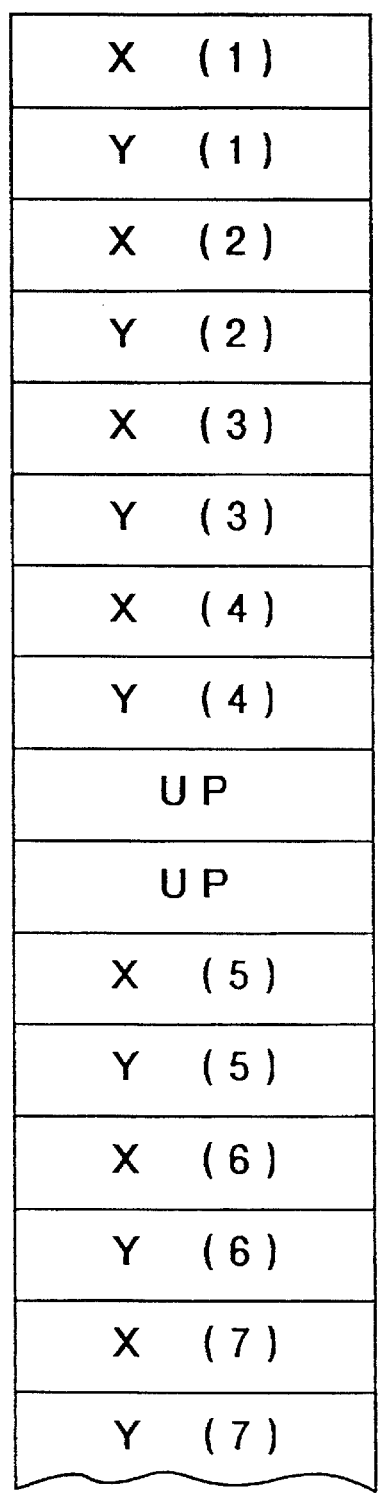
FIG. 3 is a diagram showing the structure of input coordinate data.

FIG. 3 is a diagram showing the structure of input coordinate data stored in the input-coordinate storage area 33a of RAM 33. In FIG. 3, X(1) represents the entered X-coordinate value of the starting point of the first stroke. It is composed of two bytes and has a value of 0–7 FFFH. Similarly, Y(1) represents the entered Y-coordinate value of the starting point of the first stroke; X(4) represents the entered X-coordinate value of the end point of the first stroke; and Y(4) represents the entered Y-coordinate value of the end point of the first stroke. "UP", which follows Y(4), is a pen-up code (FFFFH) representing the fact that the pen has been raised from the input panel. It indicates the end to one stroke. X(1) through Y(4) constitute the data of the first stroke. X(5) is the X-coordinate value of the starting point of the second stroke, and Y(5) is the Y-coordinate of the starting point of the first stroke. The coordinate values from X(5) onward constitute the data of the second stroke.

FIG. 4 is a correspondence table showing the correspondence between stroke patterns (actually represented by 10 items of vector data) and stroke codes. A stroke pattern of the type "↓" (the stroke pattern of "1" or a stroke pattern which is part of "4"; 7777777777) is assigned a stroke code "1". For example, when entered patterns are limited to numerals, the stroke patterns are classified as the eleven types of stroke patterns shown in FIG. 4, and all numerals are represented by combinations of eleven types of stroke codes. In case of characters, especially Chinese characters, there is a much wider variety, but these also can be expressed by combinations of stroke codes in the same manner as numerals.

FIG. 5 is a diagram showing the composition of a character pattern dictionary 33a. When the stroke pattern "↓" is entered as the data of one stroke, the stroke code from FIG. 4 is "1", and therefore "FF01H" corresponds as the output code. In case of two-stroke data, e.g., character pattern data corresponding to the numeral "4", "1" is the stroke code from FIG. 4, "3" is the jump vector from FIG. 6, and "5" is the stroke code from FIG. 4. Thus, the corresponding output code in FIG. 5 is "2334H" (JIS code). When the numeral "4" is entered, therefore, "2334H" is outputted as the output code. Here "FFXXH" is referred to as a continuance code and indicates the possibility that a further input will be made to form a particular character. "FE00H" is referred to as a character delimiting code and indicates that a compound pattern of two characters has been verified. If a character delimiting code has been outputted, one character preceding the compound pattern is delimited and outputted.

FIG. 6 is a diagram representing the conversion into vectors of eight directions. Specifically, a direction vector is classified, depending upon its angle, as a vector in any of eight directions. For example, a direction vector from left to right is classified as a vector "1", a direction vector toward the upper right is classified as a vector "2", and so on.

FIG. 7 is a flowchart illustrating the procedure of processing executed by the handwriting character recognition apparatus of the present embodiment. Processing will be described in line with the flowchart of FIG. 7.

Step S71 of the flowchart calls for initialization of the RAM 34. That is, the initial value "1" is entered in the pointer n, which indicates the address of the storage location of the input coordinate data, and the initial value "1" is entered in the pointer M, which indicates the address of the storage location of the input coordinate data for performing recognition processing. The location indicated by the initial value "1" is the location of X(1) in case of FIG. 3, namely the beginning of the storage area 34a for the input coordinate data.

The items of X-, Y-coordinate data are entered from the coordinate input unit 31 at step S72. In this example, the minimum coordinate values sent by the coordinate input unit 31 are (0,0), and the maximum coordinate values sent are (320,128). When the pen 11 is not being pressed against the coordinate input unit 31, the latter sends back the pen-up codes (FFFFH, FFFFH). The pen-up codes are outputted at the moment the pen is raised from the coordinate input unit 31, and from this point onward no data arrives from the coordinate input unit 31 until the pen is pressed down.

The input coordinate values (X,Y) are stored in the input-coordinate storage area 34a of the RAM 34 at step S73. If the value of the pointer n representing the address of the storage location of the input coordinate data is the initial value "1", this is stored at the locations of X(1), Y(1) of FIG. 3. If the value of the pointer n is "2", this is stored at the locations of X(2), Y(2) of FIG. 3.

The value of the point n representing the address of the input-coordinate storage area 34a is incremented at step S74. If "1" has been stored at X(1), Y(1) at step S73, the value of the point n will be "2" since the pointer n is incremented at step S74.

It is determined at step S75 whether the item of data (X,Y) sent from the coordinate input unit 31 is the pen-up code (FFFFH, FFFFH). If the pen 11 is not being pressed down on the coordinate input unit 31, then the pen-up code is sent and entry of one stroke ends. The program then proceeds to step S76 to begin pattern recognition. If the pen 11 is being pressed down on the coordinate input unit 31, X-, Y-coordinate data other than the pen-up code enters and the program returns to step S72 in to execute input processing of the next item of data.

In case of the pen-up code at step S75, an input character pattern is created from the stored coordinate data at step S76 in accordance with the above-described procedure, the created pattern is matched with the data in the character pattern dictionary 33a, and a pattern code is outputted. By way of example, assume that "1" has been entered as the first stroke. Since the stroke pattern "↓" has the stroke code "1", as shown in FIG. 4, matching is performed with the stroke code "1" of the character pattern data of the single-stroke character data shown in FIG. 5, and therefore the output code "FF01H" is outputted as the character code. At the moment "1" is entered as the first stroke, it is unclear at this time as to whether "--" will be entered next at the same position to form the numeral "4" or whether a subsequent numeral will be entered alongside "1". The character-entry continuance code "FF01H" inclusive of the code "1" is outputted for this reason. Assume that "12" has been entered. Here the stroke pattern "↓" of the first stroke has the stroke code "1" from FIG. 4, the jump vector, namely the vector connecting the coordinates of the end point of the first stroke and the coordinates of the starting point of the second stroke, is the upwardly directed vector "3" from FIG. 6, the stroke pattern of the second stroke is "--", and therefore the stroke code for this pattern is "3" from FIG. 4. Accordingly, the character pattern data is (1,3,3). Since this is the same as the third item of two-stroke character data in FIG. 5, the output code "FE00H" (the character delimiting code) is outputted as the character code.

It is determined at step S77 whether the character code which is the result of pattern recognition is the character-entry continuance code. Since codes such as FF01H, FF02H, FF05H and FF06H are used as character-entry continuance codes, a code greater than FF00H is a character-entry continuance code, in which case the program proceeds to step S80. If the code is less than FF00H, it is not a character-entry continuance code, and therefore the program proceeds to step S78.

When the stroke pattern "↓" is entered as the first stroke, as in the foregoing example, the character code is the character-entry continuance code "FF01H", and the program proceeds to step S80, where entry of the next stroke is awaited. On the other hand, when the stroke pattern "--" is entered as the first stroke, the character code differs from that of the foregoing example and obviously is the JIS code "2332H" for "2". Since this is a code other than a character-entry continuance code, the program proceeds to step S78.

It is determined at step S78 whether the character code resulting from character recognition is a character delimiting code. Since FE00H is used as the character delimiting code, a code greater than FE00H is a character delimiting code. Therefore, in order to perform delimiting processing of the preceding one character, the program proceeds to step S81. If the code is less than FE00H, the code is other than a character delimiting code, and therefore the program proceeds to step S79.

The character code resulting from character recognition is outputted to the exterior of the apparatus at step S79.

The current status of character recognition is stored at step S80. The continuance code outputted at step S76 is stored in the continuance code storage area BA of RAM 34, which area stores the character code currently undergoing recognition. The value of pointer n of the next item of input data is stored in the point storage area BM of RAM 34, which area stores the content of the pointer of the input coordinate data currently undergoing recognition. When the stroke pattern "↓" is entered as the first stroke, as in the foregoing example, the character code "FF01H" is outputted at step S76 and the program proceeds to step S80. At step S80, therefore, "FF01H" is stored in the continuance code storage area BA. When the input coordinate data is as shown in FIG. 3, data from X(1) to the UP position is stored. Accordingly, the value of the pointer n is "6", which indicates the position of X(5), and "6" is stored in the point storage area BM.

At step S81, the input data up to two strokes previous is recognized as one character and a character code is outputted. Further, data from one stroke previous is treated as the next character and recognition is performed again. First, the value in the continuance code storage area BA currently undergoing recognition (which value was stored at step S80) is converted into a JIS character code, and this code is outputted. Next, since the data to be recognized is the input coordinate data following that which has undergone character delimiting, the value of the point storage area BM of the input coordinate data currently undergoing recognition (which value was stored at step S80) is inputted to the pointer M representing the address of the input coordinate data to undergo recognition processing.

When "12" is entered in the previous example, first "FF01H" is outputted at step S76 at the moment "1" is entered, and "FF01H" is stored in the continuance code storage area BA. The value of the pointer n at this time is "6", which represents the location of X(5) in FIG. 3, and "6" is stored in the point storage area BM. Next, at the moment "2" is entered, the character pattern is (1,3,3), and "FE00H" is outputted at step S76. At step S81, the value of the continuance code storage area BA is "FF01H", and therefore this is outputted upon being converted into "2331H", which is the JIS code of "1". Also, the value "6" of the point storage area BM is inputted to the pointer M. At the next step S76, recognition is performed from the location of X(5) in FIG. 3, namely from the beginning of the "2" pattern.

Thus, as described above, the character sequence entered successively as "12" is treated as the two characters "1" and "2" so that the characters can be delimited and recognized.

In the embodiment set forth above, processing regarding entry of numerals is described. However, it goes without saying that similar processing can be realized with regard also to hiragana and katakana syllables in the Japanese language, alphabetic characters in the English language, Chinese characters, etc., by increasing the stroke patterns of FIG. 4 and the character pattern dictionary of FIG. 5.

Thus, in accordance with the present invention as described above, character recognizing means having a character pattern dictionary which includes compound-character patterns of two or more characters is provided. This makes it possible to provide an on-line character delimiting apparatus for handwritten characters, in which even if characters in a sequence are entered at any desired positions in a natural manner without any restriction in terms of time, the characters are delimited correctly one at a time so that character recognition can be performed in an outstanding manner.

As many apparently widely different embodiments of the present invention can be made without departing from the spirit and scope thereof, it is to be understood that the invention is not limited to the specific embodiments thereof except as defined in the appended claims.

What is claimed is:

1. A pattern delimiting method, comprising the steps of:
   preparing a dictionary storing a string of stroke data each of which defined from a point of start of contact to a point of end of contact and jump vector data, which is represented as a movement from an end of contact point of one stroke to a start of contact point of a next stroke and feature data of the string corresponding to each other, said feature data indicating whether or not the string of stroke data and jump vector data forms an individual pattern;
   matching an inputted string of stroke data and jump vector data with the string of stroke data and jump vector data stored in the dictionary beforehand and obtaining feature data of the matched string of stroke data and jump vector data from the dictionary; and
   delimiting a string of stroke data and jump vector data composing an individual pattern from the inputted string of stroke data based on the feature data obtained from the matching.

2. The delimiting method according to claim 1, wherein said feature data includes data showing whether or not a last stroke data in the set of stroke data is at an end of the individual pattern.

3. The delimiting method according to claim 1, wherein said stroke data corresponds to patterns represented by coordinates.

4. The pattern delimiting method according to claim 1, wherein said storing of stroke data and jump vector data are inputted from a digitizer.

5. The pattern delimiting method according to claim 1, wherein said coordinate data is inputted as data representing a position where an input pen is pressed on an input-tablet having electrode lines wired in vertical and horizontal directions.

6. A pattern delimiting apparatus comprising:
   means for storing a dictionary including a string of stroke data each of which is defined from a point of start of contact to a point of end of contact and jump vector data, each of which is represented as a movement from an end of contact point of one stroke to a start of contact point of a next stroke, and feature data of the string corresponding to each other, said feature data indicating whether or not the string of stroke data and jump vector data forms an individual pattern;
   means for matching an inputted string of stroke data and jump vector data with the string of stroke data and jump vector data stored in the dictionary beforehand and obtaining feature data of the matched string of stroke data and jump vector data from the dictionary; and
   means for delimiting a string of stroke data and jump vector data composing an individual pattern from the inputted string of stroke data based on the feature data obtained from said matching means.

7. The delimiting apparatus according to claim 6, wherein said feature data includes data showing whether or not a last stroke data in the set of stroke data is at an end of the individual pattern.

8. The delimiting apparatus according to claim 6, wherein said stroke data corresponds to inputted patterns represented by coordinates.

9. The pattern delimiting method according to claim 6, wherein said storing of stroke data and jump vector data are inputted from a digitizer.

10. The pattern delimiting method according to claim 6, wherein said coordinate data is inputted as data representing a position where an input pen is pressed on an input-tablet having electrode lines wired in vertical and horizontal directions.

11. A pattern delimiting method comprising the steps of:
    inputting coordinate data of patterns and contact data of a pointing device;
    extracting one or more strokes and one or more jump vectors from said coordinate data and said contact data, wherein each of said strokes is defined from a point of start of contact to a point of end of contact of the pointing device and each of said jump vectors is represented as a movement from an end of contact point of one stroke to a start of contact point of a next stroke; and
    judging whether each of said jump vectors is in the middle of an individual pattern or between two individual patterns based upon a set of the jump vector and strokes before and after the jump vector, and an order thereof.

12. The pattern recognition method according to claim 11, wherein said coordinate data is inputted from a digitizer.

13. The pattern recognition method according to claim 11, wherein said coordinate data is inputted as data representing a position where an input pen is pressed on an input-tablet having electrode lines wired in vertical and horizontal directions.

14. A pattern delimiting apparatus comprising:

means for inputting coordinate data of patterns and contact data of a pointing device;

means for extracting one or more strokes and one or more jump vectors from said coordinate data and said contact data, wherein each of said strokes is defined from a point of start of contact to a point of end of contact of the pointing device and each of said jump vectors is represented as a movement from an end of contact point of one stroke to a start of contact point of a next stroke; and means for judging whether each of said jump vectors is in the middle of an individual pattern or between two individual patterns based upon a set of the jump vector and strokes before and after the jump vector, and an order thereof.

15. The pattern recognition method according to claim 14, wherein said coordinate data is inputted from a digitizer.

16. The pattern recognition method according to claim 14, wherein said coordinate data is inputted as data representing a position where an input pen is pressed on an input-tablet having electrode lines wired in vertical and horizontal directions.

* * * * *

UNITED STATES PATENT AND TRADEMARK OFFICE
CERTIFICATE OF CORRECTION

PATENT NO. : 5,533,147

DATED : July 2, 1996

INVENTOR(S): TSUNEKAZU ARAI, ET AL.          Page 1 of 2

It is certified that error appears in the above-identified patent and that said Letters Patent is hereby corrected as shown below:

ON THE TITLE PAGE

[56]   References cited, under Foreign Patent documents:
       (Kokuku Patent No.) "62-193758" should read (Kokai
       Laid- Open Applicaiton No.)--1-37682--, and (Kokuku
       Patent No.) "63-193759" should read (Kokai Laid-Open
       Application No.) --1-37683--.

COLUMN 3

Line 11, "marcher" should read --matcher--;
  Line 37, "marcher" should read --matcher--.

COLUMN 5

Line 63, "--" should read --4--.

COLUMN 6

Line 6, "--" should read --4--;
  Line 25, "--" should read --4--.

UNITED STATES PATENT AND TRADEMARK OFFICE
CERTIFICATE OF CORRECTION

PATENT NO. : 5,533,147

DATED : July 2, 1996

INVENTOR(S) : TSUNEKAZU ARAI

It is certified that error appears in the above-identified patent and that said Letters Patent is hereby corrected as shown below:

COLUMN 7

Line 48, "defined" should read --is defined--.

COLUMN 10

Line 6, "recognition method" should read --delimiting apparatus--;
Line 8, "recogintion method" should read --delimiting apparatus--.

Signed and Sealed this

Twenty-ninth Day of April, 1997

Attest:

BRUCE LEHMAN

*Attesting Officer*   *Commissioner of Patents and Trademarks*